United States Patent
Kano

(10) Patent No.: US 8,253,955 B2
(45) Date of Patent: Aug. 28, 2012

(54) IMAGE FORMING APPARATUS AND METHOD FOR SETTING SECURITY LEVELS IN ACCORDANCE WITH A NETWORK ENVIRONMENT

(75) Inventor: Takahiro Kano, Amagasaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 820 days.

(21) Appl. No.: 12/101,491

(22) Filed: Apr. 11, 2008

(65) Prior Publication Data

US 2009/0021764 A1 Jan. 22, 2009

(30) Foreign Application Priority Data

Jul. 18, 2007 (JP) ................. 2007-187312

(51) Int. Cl.
*G06K 15/00* (2006.01)
(52) U.S. Cl. ..................................... 358/1.14
(58) Field of Classification Search .......... None
See application file for complete search history.

(56) References Cited

FOREIGN PATENT DOCUMENTS

| JP | 10143338 | | 5/1998 |
| JP | 2005-011282 | * | 1/2005 |
| JP | 2005-182291 | A | 7/2005 |
| JP | 2005-234850 | | 9/2005 |
| JP | 2006001146 | | 1/2006 |
| JP | 2007-048080 | * | 2/2007 |
| JP | 2007098596 | | 4/2007 |

OTHER PUBLICATIONS

Notice of Grounds of Rejection in JP 2007-187312 dated Jun. 9, 2009, and an English Translation thereof.
Notice of Grounds of Rejection dated Mar. 15, 2011 and an English-language translation, 10 pps.

* cited by examiner

*Primary Examiner* — Benny Q Tieu
*Assistant Examiner* — Jeremiah Bryar
(74) *Attorney, Agent, or Firm* — Buchanan Ingersoll & Rooney PC

(57) ABSTRACT

An MFP receives notification of a power state of a networked client apparatus or PC from the PC and updates user management information in accordance with the power state of the PC. The MFP determines a security level in real time in accordance with the state of the power supply of the networked client apparatus that is stored in the user management information, and sets the determined security level for the MFP.

7 Claims, 5 Drawing Sheets

| SECURITY TYPE | MODE | CONTENTS | CONDITIONS FOR SWITCHING MODES | |
|---|---|---|---|---|
| STATE OF POWER SUPPLY | 0 | NORMAL POWER SUPPLY STATE | AT LEAST 1 USER: | UP |
| | 1 | POWER-OFF STATE (OR SLEEP/POWER SAVE STATE) | ALL USERS: | DOWN |
| | ⋮ | ⋮ | ⋮ | |
| RESTRICTION ON LOCATION OF ACCESSOR | 0 | NO RESTRICTION (BOTH ACCESS FROM MAIN BODY VIA PANEL & THAT FROM REMOTE PERMITTED.) | ADMINISTRATOR: NETWORK ADMINISTRATOR: | UP UP |
| | 1 | ONLY ACCESS FROM MAIN BODY VIA PANEL PERMITTED. | ADMINISTRATOR: | UP |
| | 2 | NEITHER ACCESS FROM MAIN BODY VIA PANEL NOR THAT FROM REMOTE PERMITTED. | ADMINISTRATOR: | DOWN |
| | ⋮ | ⋮ | ⋮ | |
| RESTRICTION ON CHANGING SETTINGS | 0 | NO RESTRICTION | ADMINISTRATOR: | UP |
| | 1 | ONLY USER SETTINGS CHANGEABLE | ADMINISTRATOR: DOWN AT LEAST 1 USER: | UP |
| | 2 | NEITHER USER SETTINGS NOR ADMINISTRATOR SETTING CHANGEABLE | ADMINISTRATOR: ALL USERS: | DOWN DOWN |
| | ⋮ | ⋮ | ⋮ | |
| RESTRICTION ON FUNCTION | 0 | NO RESTRICTION ON USING FUNCTION | AT LEAST 1 REGULARLY EMPLOYED USER: | UP |
| | 1 | FUNCTION TRANSMITTING DATA FROM MFP TO OUTSIDE (E.G., E-MAIL TRANSMISSION, FAX TRANSMISSION) PROHIBITED | ALL REGULARLY EMPLOYED USERS: | DOWN |
| | ⋮ | ⋮ | ⋮ | |

FIG.3

| ID | USER TYPE | EMPLOYEE TYPE | USER LOCATION INFO | USER STATE |
|---|---|---|---|---|
| 1 | ADMINISTRATOR | REGULAR EMPLOYEE | 199.168.1.5 | UP |
| 2 | NETWORK ADMINISTRATOR | REGULAR EMPLOYEE | 199.168.1.6 | DOWN |
| 3 | GENERAL USER | PARTNERSHIP EMPLOYEE | 199.168.1.100 | UP |
| ⋮ | ⋮ | ⋮ | ⋮ | ⋮ |

FIG.4

| SECURITY TYPE | MODE | CONTENTS | CONDITIONS FOR SWITCHING MODES |
|---|---|---|---|
| STATE OF POWER SUPPLY | 0 | NORMAL POWER SUPPLY STATE | AT LEAST 1 USER: UP |
| | 1 | POWER-OFF STATE (OR SLEEP/POWER SAVE STATE) | ALL USERS: DOWN |
| | ⋮ | ⋮ | ⋮ |
| RESTRICTION ON LOCATION OF ACCESSOR | 0 | NO RESTRICTION (BOTH ACCESS FROM MAIN BODY VIA PANEL & THAT FROM REMOTE PERMITTED.) | ADMINISTRATOR: UP NETWORK ADMINISTRATOR: UP |
| | 1 | ONLY ACCESS FROM MAIN BODY VIA PANEL PERMITTED. | ADMINISTRATOR: UP |
| | 2 | NEITHER ACCESS FROM MAIN BODY VIA PANEL NOR THAT FROM REMOTE PERMITTED. | ADMINISTRATOR: DOWN |
| | ⋮ | ⋮ | ⋮ |
| RESTRICTION ON CHANGING SETTINGS | 0 | NO RESTRICTION | ADMINISTRATOR: UP |
| | 1 | ONLY USER SETTINGS CHANGEABLE | ADMINISTRATOR: DOWN AT LEAST 1 USER: UP |
| | 2 | NEITHER USER SETTINGS NOR ADMINISTRATOR SETTING CHANGEABLE | ADMINISTRATOR: DOWN ALL USERS: DOWN |
| | ⋮ | ⋮ | ⋮ |
| RESTRICTION ON FUNCTION | 0 | NO RESTRICTION ON USING FUNCTION | AT LEAST 1 REGULARLY EMPLOYED USER: UP |
| | 1 | FUNCTION TRANSMITTING DATA FROM MFP TO OUTSIDE (E.G., E-MAIL TRANSMISSION, FAX TRANSMISSION) PROHIBITED | ALL REGULARLY EMPLOYED USERS: DOWN |
| | ⋮ | ⋮ | ⋮ |

IMAGE FORMING APPARATUS AND METHOD FOR SETTING SECURITY LEVELS IN ACCORDANCE WITH A NETWORK ENVIRONMENT

This application is based on Japanese Patent Application No. 2007-187312 filed with the Japan Patent Office on Jul. 18, 2007, the entire content of which is hereby incorporated by reference.

BACKGROUND OF THE INVENTION

1. Field of the Invention

The present invention relates generally to image forming apparatuses and methods of setting a security level in the image forming apparatuses, and particularly to image forming apparatuses having a plurality of security levels that can switch the levels optimally and methods of setting a security level in the image forming apparatuses.

2. Description of the Related Art

As printing apparatuses are enhanced in performance, multifunction peripherals (MFPs) having a print function and in addition thereto a copy function, a scan function and a facsimile function have been implemented. While such MFPs operate in response to instructions directly received that are input via a panel or the like, they are also connected to a network and thus operate in response to instructions received that are input from another apparatus on the network. Thus allowing a large number of functions to be available to a large number of users via a network provides increased convenience.

On the other hand, allowing a large number of users to use such functions via the network increases the necessity of management of the use of the functions by the users. Accordingly, a technique employed to restrict use of a function on a network from another apparatus is disclosed for example in Japanese Laid-Open Patent Publication No 2005-182291 More specifically, the publication discloses a server restricting provision of a function (or resource) depending on whether how the function is currently used can be monitored.

Furthermore, as the MFPs are available to a large number of users via a network, security management is also an important issue for the MFPs. A security management required includes for example:

(1) automatically reinforcing security when an administrator of the apparatus is absent, and (2) automatically saving the power of or powering off an apparatus when no one uses it.

SUMMARY OF THE INVENTION

The present invention has been made to address such issues as above and it contemplates an image forming apparatus having a plurality of security levels that can optimally switch the levels in accordance with the network environment of interest to provide appropriate security management, and a method of setting a security level in the image forming apparatus.

To achieve the above object the present invention in one aspect provides an image forming apparatus connected to a network, including: an obtaining unit obtaining a state of a power supply of other apparatus connected to the network, and a setting unit accessing previously stored first information and determining and setting a level of security in accordance with the state of the power supply of the other apparatus as obtained by the obtaining unit, the first information being information defining a correspondence between the state of the power supply of the other apparatus and the level of security.

The present invention in another aspect provides a method of setting a security level of an image forming apparatus connected to a network, including the steps of: obtaining a state of a power supply of other apparatus connected to the network, and accessing previously stored information and determining and setting a level of security in accordance with the state of the power supply of the other apparatus as obtained, the information being information defining a correspondence between the state of the power supply of the other apparatus and the level of security.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 shows a specific example of a user management table.

FIG. 4 shows a specific example of a security setting table.

DESCRIPTION OF THE PREFERRED EMBODIMENTS

Hereinafter reference will be made to the drawings to describe an embodiment of the present invention. In the following description identical parts and components are identically denoted. Their names and functions are also identical.

Figure 1:
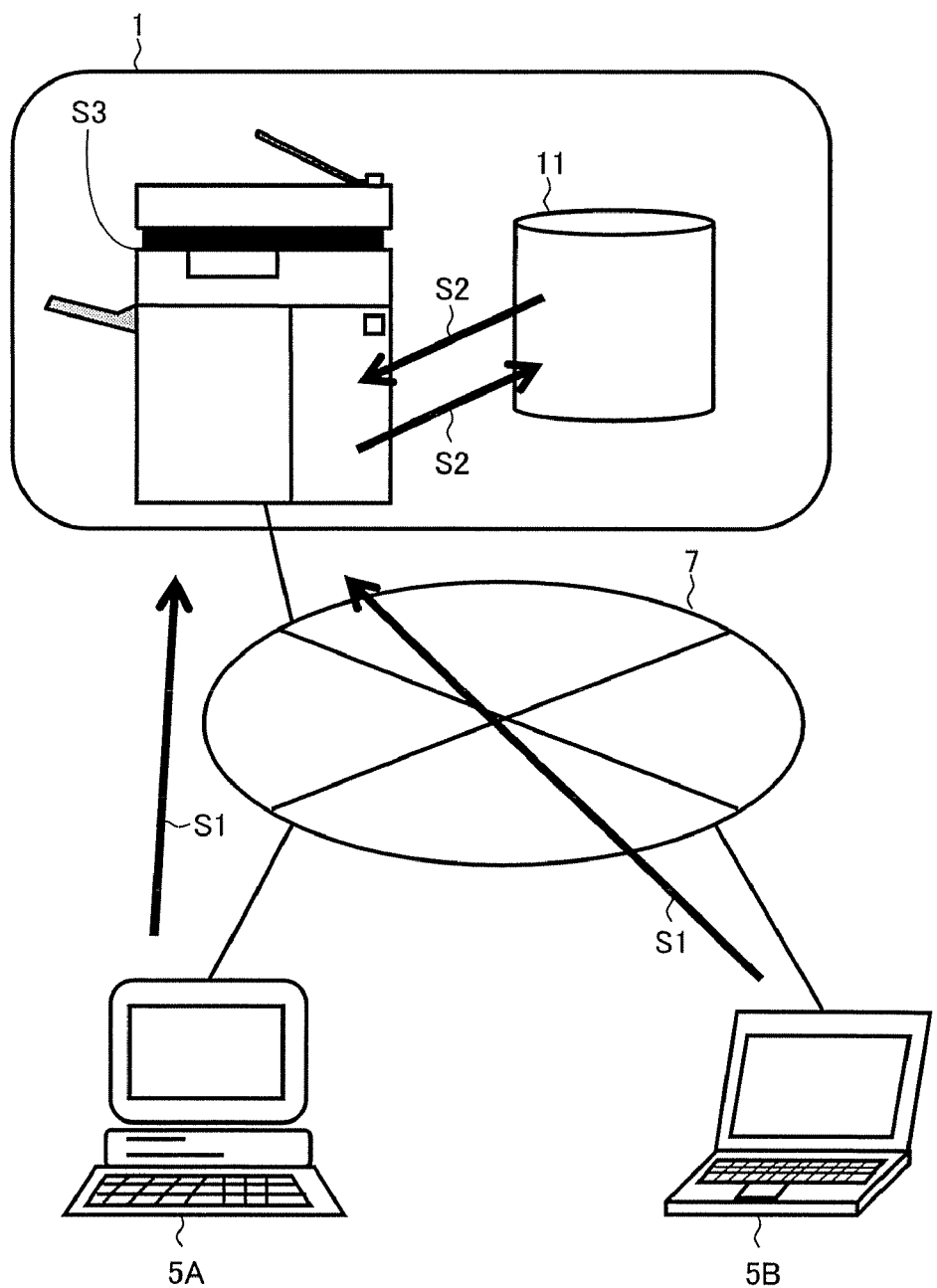
FIG. 1 shows a specific example of a system configuration according to an embodiment.

With reference to FIG. 1, the present embodiment provides a system including a multifunction peripheral (MFP) 1 serving as an image forming apparatus and personal computers (PCs) 5A and 5B serving as client apparatuses, and they are connected via a wired or wireless network 7. PC 5A, 5B may be a so called desktop PC or may be a notebook PC, a mobile PC or the like. The client apparatus is not limited to a PC; it may be a mobile phone, a personal digital assistant (PDA), or an other image forming apparatus. Hereinafter PCs 5A and 5B will be referred to as PC 5 representatively and their basic configurations are also assumed to be identical. Similarly, the image forming apparatus is not limited to an MFP, it may be a printer, a scanner, a facsimile apparatus or the like.

As PC 5 is assumed to be implemented as a general personal computer, its hardware configuration may be that of the general personal computer. In the present embodiment it is assumed that it includes a storage unit, which has a program stored therein for performing a process in accordance with the present invention, and that a CPU (not shown) reads and executes the program to perform a process described later. In the following description the program stored in PC 5 will be referred to as an agent program.

Figure 2:
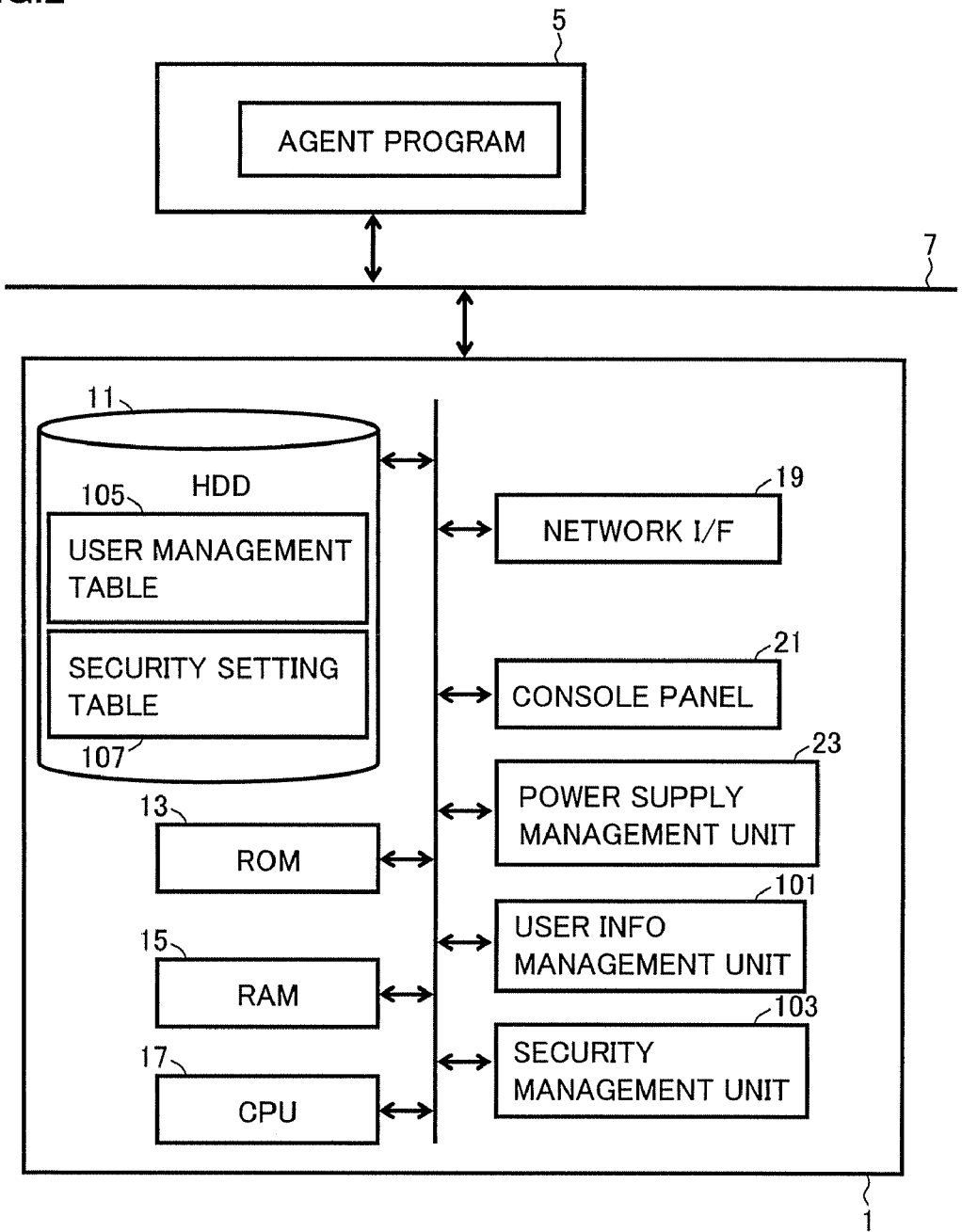
FIG. 2 is a block diagram of a configuration of an MFP and that of a PC in the embodiment, that the MFP requires to set a security level for the MFP.

With reference to FIG. 2, MFP 1 is configured including: a hard disk drive (HDD) 11, a read only memory (ROM) 13, and a random access memory (RAM) 15 serving as a storage device; a central processing unit (CPU) 17 reading and executing a program stored for example in HDD 11 to generally control the apparatus; a network interface 19 serving as an interface for connecting to network 7; a console panel 21; a power supply management unit 23 supplying and cutting power; a user information management unit 101 for management of user information described later; and a security management unit 103 for management of a state of security. Note that user information management unit 101 and security management unit 103 may be a function implemented as software by CPU 17 executing the program.

Furthermore, HDD 11 has a user management table 105 and a security setting table 107 stored therein.

The user management table is provided to register a user permitted to use MFP 1 for management of the use of MFP 1 by the user. The table has user management information stored therein. The user management information includes for each user identification information; user type; information of a position on a network of a client apparatus associated with a user; and information indicating a state of the client apparatus. More specifically, the identification information for the user corresponds to an ID code, a user name, a section to which the user belongs and the like. In the specific example shown in FIG. 3, it is assumed to be an ID number. User type corresponds to a type of the user in terms of security, i.e., a type of authority over MFP 1. In the specific example shown in FIG. 3 it is assumed to include: guest user (public user); registered user (general user); main-body administrator, network administrator, regular employee, and other types of employees, such as temporary stuff, a partnership employee, and the like types. The information of a position on a network of a client apparatus associated with the user may be any information that can identify the client apparatus on the network. In the specific example shown in FIG. 3, it is indicated as "user location information" and assumed to be an IP address on network 7 of PC 5 used by the user. The information indicating a state of the client apparatus corresponds to a state of PC 5 with respect to power supply. In the specific example shown in FIG. 3, it is indicated as "user state" and assumed to be information indicating whether PC 5 is powered on (UP) or powered off (DOWN).

Note that it is needless to say that the contents shown in FIG. 3 is merely one example and the present invention is not limited thereto. Furthermore while in the present embodiment the user management information is stored in HDD 11 of MFP 1 in the form of a table, it may not be data stored in the form of a table; it may be stored in a different form.

The security setting table is used to set a level of security. It has security setting information stored therein. The security setting information includes for each security type a mode corresponding to a level of security that can be set and a condition for switching to the mode. Security type is an attribute controllable stepwise to ensure security with respect to the use of MFP 1. In the specific example shown in FIG. 4, the security type is assumed to include: a state of the power supply of MFP 1; a restriction on an accessor permitted to access MFP 1; a restriction on a range changeable with respect to a setting of MFP 1; and a restriction on a range available of a function of MFP 1.

More specifically, if the security type is the state of the power supply of MFP 1, then, with reference to FIG. 4, the security type has security levels including a mode 0 and a mode 1, Mode 0 is assumed to correspond to a normal power supply state. Mode 1 is assumed to correspond to a power-off state, a sleep state, or a power save mode state. The modes are switched under conditions defined as follows: a mode is switched to mode 0 if a client apparatus associated with at least one user has an UP state (i.e., a power-on state), and a mode is switched to mode 1 if all client apparatuses on network 7 have a DOWN state (i.e., the power-off state).

If the security type is the restriction on an accessor permitted to access MFP 1, then, with reference to FIG. 4, the security type has security levels including modes 0, 1, and 2. In mode 0 both an access from MFP 1 via console panel 21 and that from any PC 5 on network 7 are permitted with no restriction imposed thereon. In mode 1 only an access from MFP 1 via console panel 21 is permitted and that from PC 5 is prohibited. In mode 2 neither an access from MFP 1 via console panel 21 nor that from any PC 5 is permitted. The modes are switched under conditions defined as follows: a mode is switched to mode 0 if a client apparatus associated with a user who is an administrator in user type has the UP state and a client apparatus associated with a user who is a network administrator in user type has the UP state. A mode is switched to mode 1 if a client apparatus associated with a user who is an administrator in user type has the UP state. A mode is switched to mode 2 if a client apparatus associated with a user who is an administrator in user type has the DOWN state.

If the security type is the restriction on a range changeable with respect to a setting of MFP 1, then, with reference to FIG. 4, the security type has security levels including modes 0, 1 and 2. Mode 0 allows both user settings corresponding to matters that are set that are specific to a user and administrator settings corresponding to matters that are set that are allowed for an administrator to be changed without a restriction in range. Mode 1 allows user settings to be changed. Mode 2 prohibits both user settings and administrator settings. The modes are switched under conditions defined as follows: a mode is switched to mode 0 if a client apparatus associated with a user who is an administrator in user type has the UP state. A mode is switched to mode 1 if a client apparatus associated with a user who is an administrator in user type has the DOWN state and a client apparatus associated with at least one user has the UP state. A mode is switched to mode 2 if a client apparatus associated with a user who is an administer in user type has the DOWN state and all client apparatuses on network 7 have the DOWN (or power-off) state.

If the security type is the restriction on a range available with respect to a function of MFP 1, then, with reference to FIG. 4, the security type has security levels including modes 0 and 1. Mode 0 allows any function to be used without a restriction. Mode 1 prohibits using a function transmitting data from MFP 1 to an external apparatus, such as an e-mail transmission function, a facsimile transmission function, and the like. The modes are switched under conditions defined as follows: a mode is switched to mode 0 if at least one of client apparatuses associated with users who are regular employees in user type has the UP state. A mode is switched to mode 1 if all client apparatuses associated with users registered in MFP 1 as regular employees in user type have the DOWN state.

Note that it is needless to say that the contents shown in FIG. 4 is merely one example and the present invention is not limited thereto. Furthermore while in the present embodiment the user management information is stored in HDD 11 of MFP 1 in the form of a table, it may not be data stored in the form of a table, it may be stored in a different form.

The FIG. 3 user management table and the FIG. 4 security setting table may previously be stored in HDD 11 of MFP 1 or may be created or changed by an administrator, a network administer or a predetermined user. For example, if a new user who uses MFP 1 is to be registered, a user (e.g., an administrator) having authority for registration inputs necessary information to add information of the new user in the user management table. Furthermore, the user management table may have stored therein as the user management information a function of MFP 1 that the user is permitted to use, the number of sheets that the user is permitted to use, and other information for management of use.

Furthermore while in the present embodiment the user management table and the security management table are stored in HDD 11 internal to MFP 1, a system including a server apparatus connected to MFP 1 may be provided and the server apparatus may have one or both of the tables stored therein. In that case, MFP 1 accesses the server apparatus to communicate information, as required. Furthermore the server apparatus may be connected to MFP 1 directly, rather than via network 7, or, as well as PC 5, may be connected to MFP 1 via network 7.

The agent program stored in PC 5 starts as PC 5 starts. The agent program has a function such that when that a change is detected in the state of PC 5, PC 5 is controlled to perform an operation notifying MFP 1 accordingly. In the present embodiment the change detected in the state of PC 5 indicates a change in the state of the power supply thereof. When PC 5 is powered on or recovers from the sleep state to the normal power supply state, the agent program detects such and notifies MFP 1 that PC 5 has the UP state. Furthermore when an operation powering off PC 5 is performed or PC 5 shifts from the normal power supply state to the sleep state, or the like, the agent program detects such and notifies MFP 1 that PC 5 has the DOWN state. In the above description, such notification is issued when that PC 5 has a changed state, as described above, is detected. Alternatively, notification indicating the current state (of the power supply) of PC 5 may be issued at a predetermined interval or when that a predetermined event has occurred is detected.

MFP 1 receives the notification from PC 5 via network interface 19. The notification is input to user information management unit 101, which in turn updates the "user state" of the user management table of FIG. 3, as based on the notification. Security management unit 103 is timed, as predetermined, to access user management table 105 and security setting table 107 to refer to the user management information and the security setting information to determine for each security type a security level that satisfies a condition. Security management unit 103 outputs a control signal to a function as required so that MFP 1 has the determined security level. While in the present embodiment security management unit 103 is timed to access user management table 105 and security setting table 107 when the notification is received from PC 5, it may alternatively be timed to do so at a predetermined temporal interval or when that a predetermined event has occurred is detected.

Figure 5:
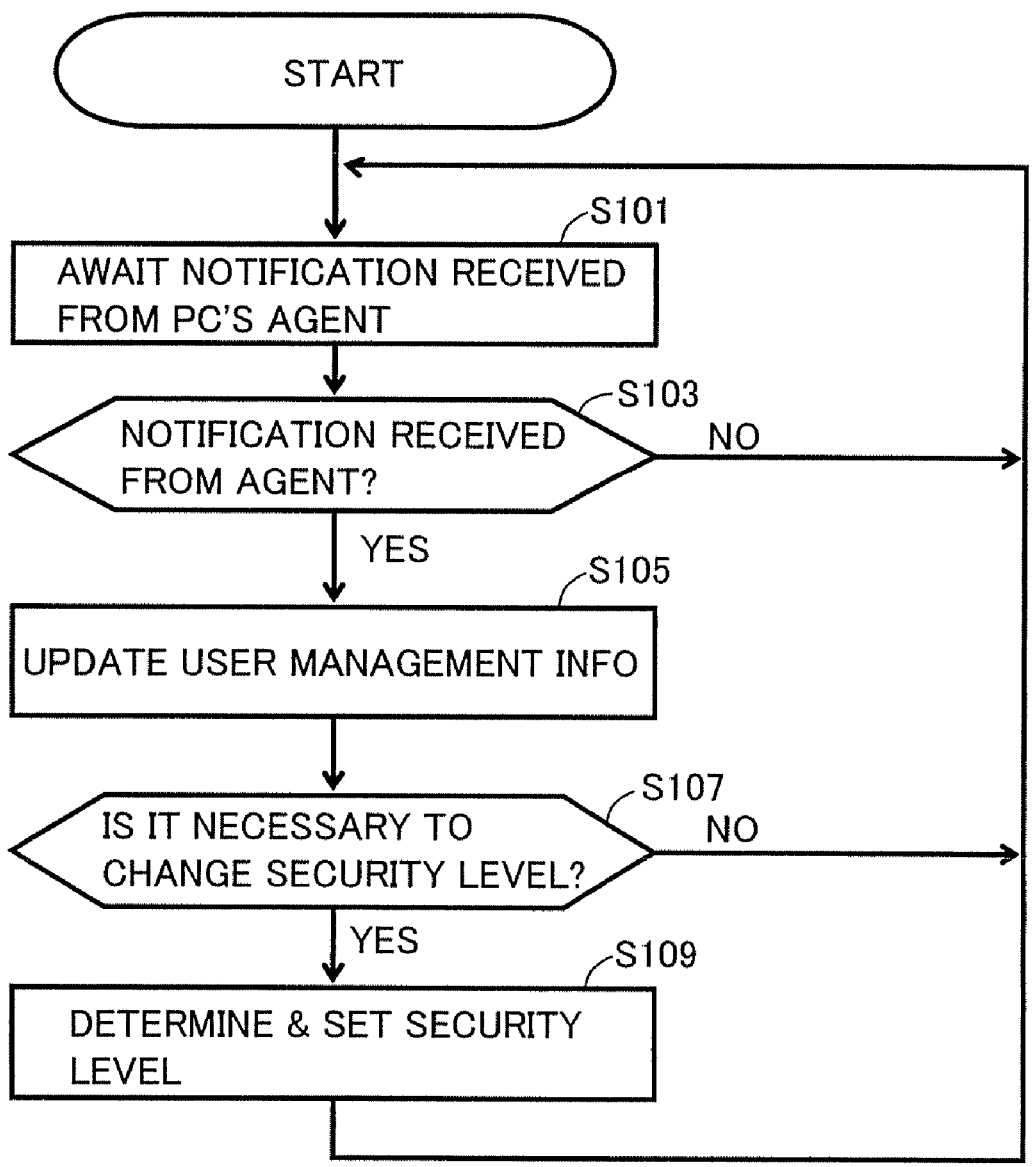
FIG. 5 is a flowchart of a specific example of a process executed in the MFP of the embodiment for setting a security level for the MFP.

FIG. 5 is a flowchart of a specific example of a process executed in MFP 1 of the present embodiment for setting a security level for MFP 1. The FIG. 5 process is implemented in MFP 1 by CPU 17 reading a program that is stored in HDD 11 or the like, and executing the program to control each component shown in FIG. 2.

With reference to FIG. 5, the process starts, and MFP 1 awaits the notification as described above transmitted from PC 5 (step (S) 101). When MFP 1 receives the notification from PC 5 via network interface 19 (YES at S103), user information management unit 101 updates the user management information stored in user management table 105 (S105). Furthermore, security management unit 103 refers to the security setting information stored in security setting table 109 to check for each security type whether the "user state" of the user management information satisfies a condition for switching a security level. Security management unit 103 thus determines whether it is necessary to change a security level (S107). If security management unit 103 determines that it is necessary to change the security level (YES at S107) security management unit 103 determines a security level based on the "user state" of the user management information, and outputs a control signal to a corresponding function so that MFP 1 has that security state (S109).

For example, if the security type to be changed is the state of the power supply of MFP 1, and MFP 1 is to be shifted to the power save state or mode 1, then at S109 security management unit 103 outputs a control signal to power supply management unit 23 to supply power in an amount set for power-saving and to where the power should be supplied when power-saving should be done. Furthermore, for example, if the security type to be changed is an accessor permitted to access to MFP 1, and it is shifted to a security level prohibiting an access done via console panel 21, i.e., mode 2, then at step S109 security management unit 103 outputs a control signal to cause console panel 21 to: gray out and thus indicate an option; display an indication that no operation is allowed; or the like.

Thereafter the process returns to S101 and MFP 1 awaits the notification transmitted from PC 5.

The above process is repeated while MFP 1 is connected to network 7. Thus MFP 1 can determine a security level and set the determined security level for MFP 1, as shown in FIG. 1. With reference to FIG. 1, MFP 1 receives notification of a power state from a client apparatus or PC 5 on network 7 (S1). MFP 1 updates the user management information, as based on the power state (S2). MFP 1 determines a security level in real time in accordance with the state of the power supply of the client apparatus on network 7 that is stored in the user management information, and sets the determined security level for MFP 1 (S3). Consequently MFP 1 has a security state maintained automatically to be an optimum state in accordance with the power state of the client apparatus or PC 5 on network 7.

Furthermore there can also be provided a program causing a computer to execute the process executed in MFP 1 for setting a security level for MFP 1, as described above. Such program can be stored in a flexible disc, a compact disk-read only memory (CD-ROM), read only memory (ROM), random access memory (RAM), a memory card or a similar computer readable storage medium included in the computer, and can be provided as a program product. Alternatively, the program may be provided in a storage medium such as a computer incorporated hard disk. Furthermore, the program can also be provided by downloading it via a network.

Note that the program according to the present invention may be a program module provided as a part of an operating system (OS) of a computer, that calls a necessary module, as timed as predetermined, in a predetermined sequence to perform a process. In that case, the program per se does not include the module and cooperates with the OS to perform the process. Such program that does not include the module can also be included in the program according to the present invention.

Furthermore the program according to the present invention may be incorporated in a portion of another program and thus provided. Such program per se thus provided also does not include a module included in the other program, and cooperates with the other program to perform a process. Such program incorporated in the other program can also be included in the program according to the present invention.

The program product provided is installed in a hard disk or a similar program storage unit and executed. Note that the program product includes a program per se and a storage medium having the program stored therein.

In accordance with the present invention an image forming apparatus used in a networked environment and having a plurality of security levels can automatically switch in security level in accordance with how other apparatus is connected to a network. This allows security management reflecting how the other apparatus is connected to the network.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image forming apparatus connected to a network, comprising:
   a central processing unit configured to implement an obtaining unit that obtains a state of a power supply of other apparatus connected to said network, and a setting unit that accesses previously stored first information and that determines and sets a level of security in accordance with said state of said power supply of said other apparatus as obtained by said obtaining unit, said first information being information defining a correspondence between said state of said power supply of said other apparatus and said level of security.

2. The image forming apparatus according to claim 1, further comprising an update unit accessing previously stored second information to update said second information in accordance with said state of said power supply of said other apparatus as obtained by said obtaining unit, said second information being information of said other apparatus, wherein said setting unit sets said level of security based on said first and second information.

3. The image forming apparatus according to claim 2, wherein:
   said second information includes information indicating what type of authority a user associated with said other apparatus has over said image forming apparatus; and
   said first information includes information defining a correspondence between a state of a power supply of an apparatus associated with a type of a user and said user and a level of security.

4. The image forming apparatus according to claim 2, further comprising a storage unit, wherein said second information is stored in said storage unit.

5. The image forming apparatus according to claim 1, wherein said security includes at least one of: a state of a power supply of said image forming apparatus; a restriction on an accessor permitted to access said image forming apparatus; a restriction on a range changeable with respect to a setting of said image forming apparatus; and a restriction on a range available with respect to a function of said image forming apparatus.

6. The image forming apparatus according to claim 1, further comprising a storage unit, wherein said first information is stored in said storage unit.

7. A method of setting a security level of an image forming apparatus connected to a network, comprising the steps of:
   obtaining a state of a power supply of other apparatus connected to said network; and
   accessing previously stored information and determining and setting a level of security in accordance with said state of said power supply of said other apparatus as obtained, said information being information defining a correspondence between said state of said power supply of said other apparatus and said level of security.

* * * * *